United States Patent Office 2,706,916
Patented Apr. 26, 1955

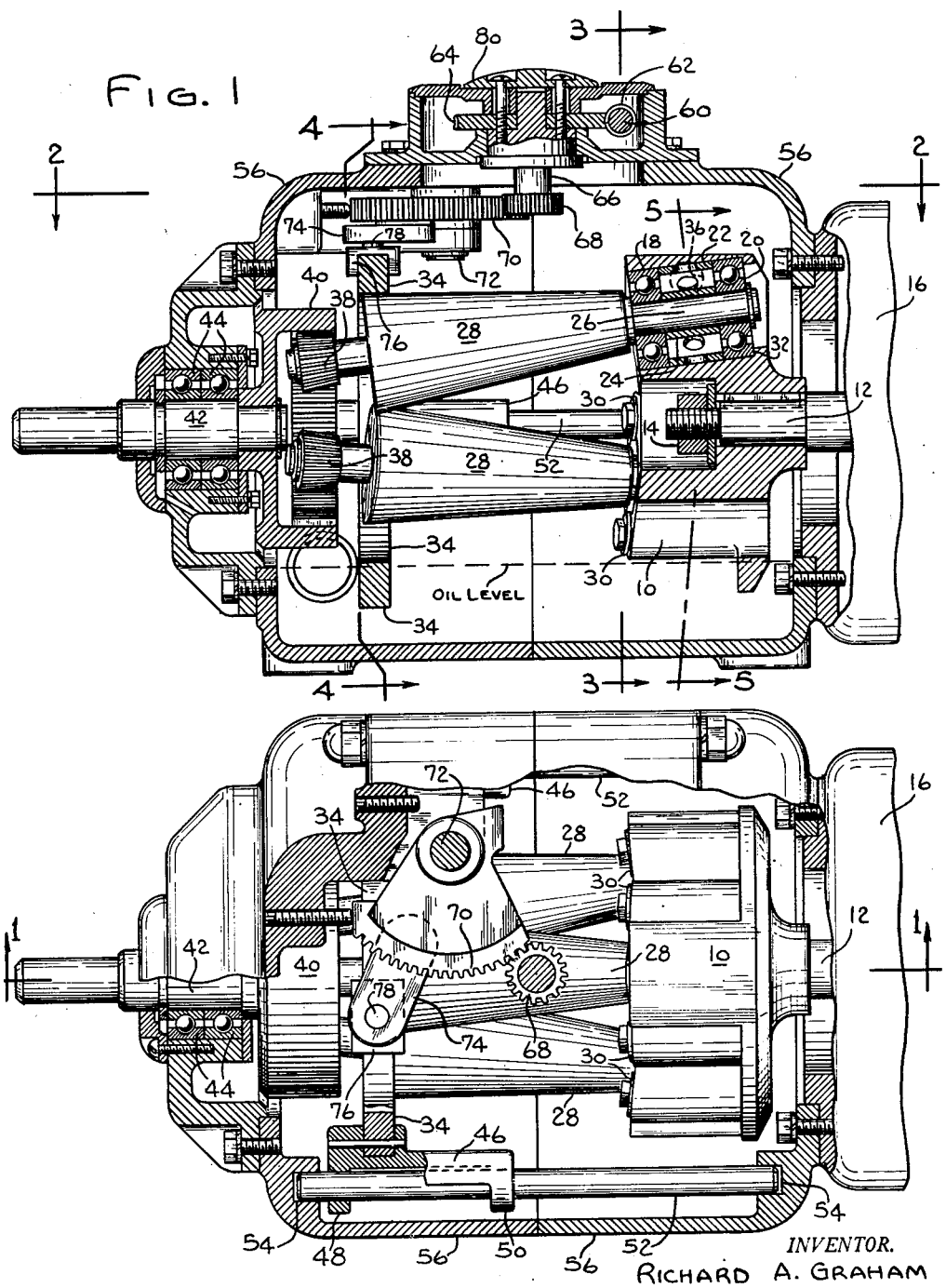

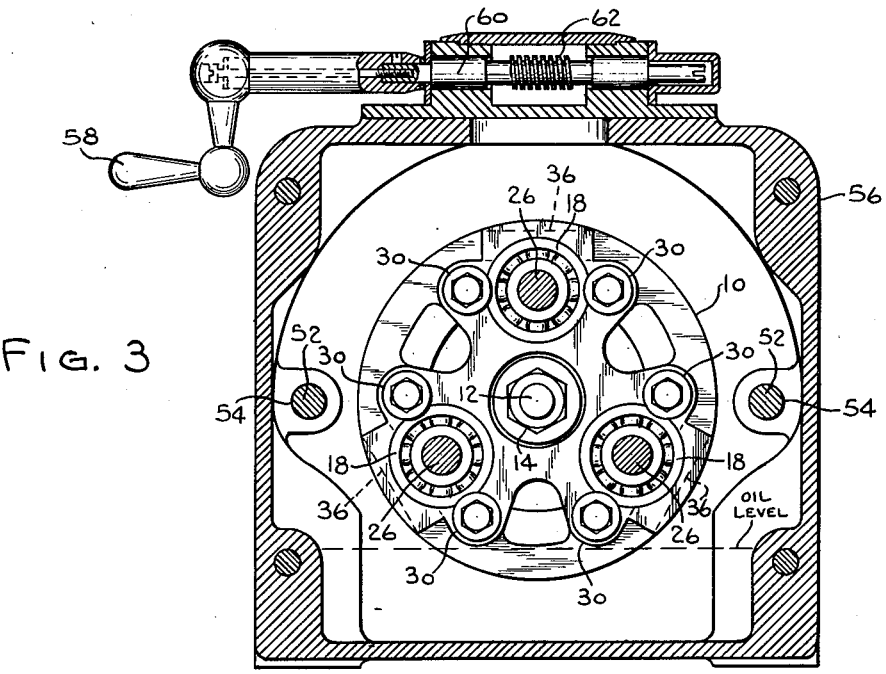
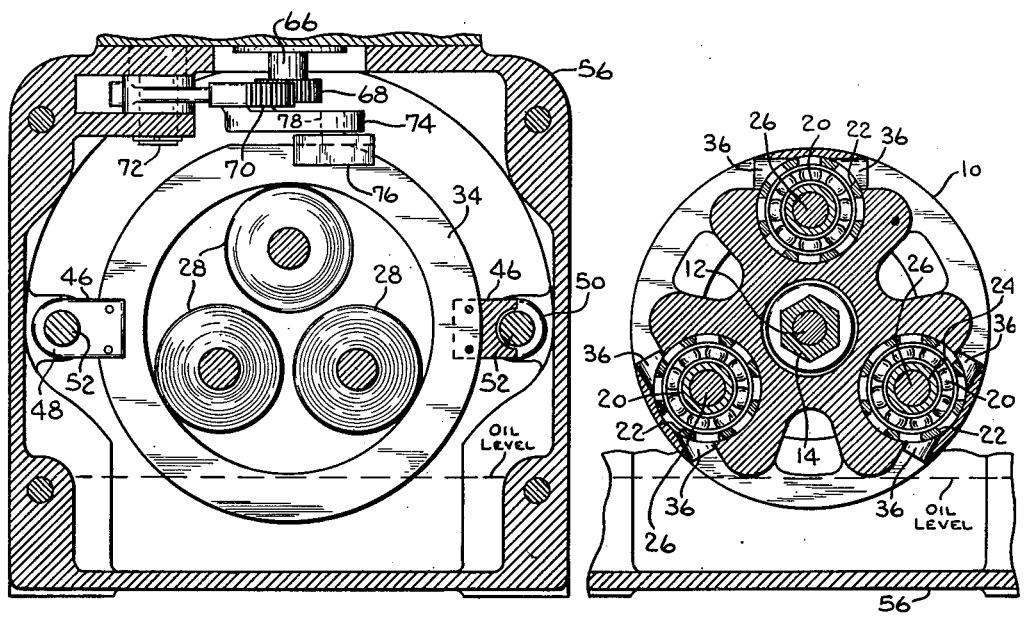

2,706,916

VARIABLE SPEED TRANSMISSION

Richard A. Graham, Milwaukee, Wis.

Application December 17, 1951, Serial No. 261,963

3 Claims. (Cl. 74—796)

This invention relates to improvements in variable speed transmissions of the type employing a group of inclined longitudinally tapered planetary rollers intermediate the drive and driven shafts and a non-rotatable encircling contact ring adjustable lengthwise with respect to the rollers to regulate the planetary action and thus vary the speed and direction of rotation of the driven shaft.

This invention is an improvement on the structure shown in the application of Louis A. Graham, Serial No. 168,805, now abandoned, for Variable Speed Transmission.

An object of this invention is to provide apparatus for moving the control ring to obtain a substantially equal speed change for equal angular movement of the apparatus over the entire range of ring movement. The resultant linear relationship is highly desirable where the speed change is to be effected by automatic controls. Linearity also permits use of evenly spaced markings which makes accurate reading and manual adjustment easier. The only method heretofore considered practical for effecting linear control involved the use of a costly cam plate which, if machined, resulted in almost prohibitive cost, or, if die cast, necessarily required softer metals subject to excessive wear. The present structure employs an arm pivotally mounted in the housing and connected to the control ring to move the ring axially along the rollers as the arm is rotated. By locating the pivot axis of the arm parallel to and spaced from a plane including the carrier axis and adjacent the large end of the rollers I have obtained substantial linearity.

Another object of this invention is to increase the life of the roller bearings by providing structure which lessens the bearing load and insures proper lubrication of the bearings. This is accomplished by employing perforated bearing spacers which admit oil to the bearings and space the bearings.

Another object is to provide a simple, rugged guide for the control ring which permits the housing to be shortened considerably, thus reducing the size and cost of the housing. In addition, this ring mount itself is less costly and easier to fabricate than that shown in said application or in previous transmissions employing machined lands on the inside of the housing.

Other objects and advantages will be pointed out in, or be apparent from, the specification and claims, as will be obvious modifications of the single embodiment shown in the drawings, in which:

Fig. 1 is a vertical section through the transmission;
Fig. 2 is a plan view, partly in section, as indicated by line 2—2 in Fig. 1;
Fig. 3 is a vertical section taken on line 3—3 in Fig. 1;
Fig. 4 is a vertical section of Fig. 1 on line 4—4; and
Fig. 5 is a section through the carrier on line 5—5 to show the lubrication holes in the carrier and the perforated bearing spacer.

Referring to the drawings in detail, carrier 10 is keyed to electric motor shaft 12 and retained thereon by nut 14 to rotate at the speed of the electric motor in housing 16. The carrier is provided with three downwardly inclined bores each of which receives a pair of bearing assemblies 18, 20 axially spaced by circumferentially perforated spacer sleeve 22 and interior sleeve 24. Stub shaft 26 on the small end of each roller 28 is mounted in a bearing and spacer assembly to rotate with and with respect to the carrier as the carrier rotates. Retaining rings 30, 30 hold each bearing and spacer assembly against shoulder 32 at the right-hand end (Fig. 1) of the bore.

The three bores in carrier 10 are inclined with respect to the carrier so that the outer surface of each of the three rollers 28 is parallel to the axis of the carrier and will be held firmly in contact with the inside of the axially movable control ring 34. Suitable shims are placed between the right-hand bearing assembly 20 and shoulder 32 to lock the rollers in contact with the control ring. Insofar as the rollers are held in contact with the control ring by means of the bearings, this construction is similar to that shown in Graham Patent No. 2,535,409 or in the aforesaid Graham application.

In said Graham application the bearing assemblies are subjected to unduly great tangential loads. By employing spaced apart bearings the tangential load on each bearing is materially decreased and bearing life is correspondingly increased. The increased bearing life results in an increase of the horse-power rating of the transmission. The spacing is accomplished by spacer sleeve 22 which admits oil through its perforations from generally tangential holes 36 through the carrier which dip into the oil in the housing with each revolution of the carrier. In this manner oil is introduced to the space between the bearings and proper lubrication under all operating conditions is insured. The provision for adequate lubrication of the bearings, of course, adds to the bearing life.

Pinion gears 38 are mounted on the large end of the rollers to constantly mesh with ring gear 40 fixed on output shaft 42 rotatably mounted in bearings 44, 44 and projecting through the end of the housing. The rotational speed and direction of rotation of ring gear 40 and driven shaft 42 is dependent upon the axial position of control ring 34.

The control ring is provided with diametrically opposed generally U-shaped brackets 46 fixed to the ring and having aligned holes or slots in each of the legs 48, 50 to receive guide rods 52 fixed in sockets 54 at each end of the housing. The brackets slide on the rods which guide and prevent rotation of the ring. It will be noted that the bracket is formed so that the right-hand leg 50 (Fig. 2) extends almost to the end of the housing when the ring is at the small end of the rollers. This permits the bearing surfaces of bracket 46 to be widely spaced to hold the ring firmly without requiring extra housing length. Furthermore, this design permits the housing to be fabricated of two similar halves 56, 56 which simplify casting and subsequent operations and are of such size that housings for large units may be manufactured on production machinery which would not be capable of machining an integral housing fabricated in accordance with conventional practice.

Axial movement of control ring 34 is regulated from the exterior of the housing by turning hand wheel 58 to rotate shaft 60 and worm gear 62 which engages horizontal gear 64 mounted on shaft 66. Pinion gear 68 on the lower end of shaft 66 engages segment 70 rotatable on pin 72 mounted in the housing. Arm 74 is fixed to segment 70 and rotatably carries saddle 76 mounted on pin 78 and adapted to straddle the flat top portion of ring 34. Therefore, when shaft 66 rotates to turn pinion 68 and segment 70, arm 74 moves about the pivot axis of pin 72 to move the ring 34 along guide rods 52 and vary the output speed of the transmission.

As may be readily demonstrated by the well-known mathematics applicable to transmissions of this type, a relatively small axial movement of control ring 34 at the small end of the roller will produce the same speed change as a greater movement of the control ring at the large end of the roller will produce. Therefore, I have located the pivot axis of the pin 72 (which is the pivotal point for the ring actuating arm 74) parallel to and laterally spaced from a plane including the axis of the carrier and substantially closer to the large end of the rollers than to the small end of the rollers. With this construction it will be apparent that an equal angular movement of the arm 74 will effect a smaller longitudinal movement of the control ring adjacent the small end of the roller than it will when the ring is adjacent the large end of the roller. In the construction shown in the drawings equal angular movements of the control arm effect substantially equal speed changes. This linear control is a matter of considerable importance where the speed changes are effected automatically rather than manually and the automatic mechanism feeds the movement into the hand wheel or otherwise actuates shaft 66 or shaft 72. If the linearity of control were not obtained it would be necessary to resort to complex external cam mechanisms to properly control the speed under automatic operational conditions. Even when the speed is regulated manually it is of considerable importance and convenience to have the linear relationship since it simplifies the accurate control of speed and simplifies direct calibration in feet, minutes, pounds, hours, gallons per minute or other calibration depending on the service to which the drive is to be applied. Furthermore, indicating dial 80, rotatable with gear 64, may be provided with equally spaced indicia, rather than following an arbitrary progression which is harder to read and understand.

In the construction shown in the drawings the pivot axis of pin 72 is located as far from a vertical plane through the carrier axis and is as close to the large end of the rollers as is practical with the particular housing design. The illustrated embodiment obtains substantial linearity which is completely satisfactory for the accuracy requirements demanded by industry.

Although but one embodiment of the present invention has been illustrated and described, it will be apparent to those skilled in the art that various changes and modifications may be made therein without departing from the spirit of the invention or from the scope of the appended claims.

I claim:

1. The combination with a variable speed transmission of the type having a rotary carrier, a plurality of inclined tapered planetary rollers rotatably mounted in said carrier for rotation with and with respect to the carrier, a pinion gear rotatable with each of the rollers, a ring gear meshing with said pinion gears and connected to an output shaft, and an axially movable control ring encircling said rollers, of means for regulating movement of the control ring to achieve a substantially linear relationship between the movement imparted to the regulating means and the speed change effected thereby, said means comprising, a pivot in said housing having its axis parallel to and spaced from a plane containing the carrier axis and being substantially closer to the large end of the rollers than the small end of the rollers, an arm mounted for movement about the axis of said pivot, means connecting the arm to the ring so the ring is moved axially of the carrier as the arm is moved, said connecting means being closer as measured axially of the carrier to said pivot axis when the ring is at the large ends of the rollers than when the ring is at the small ends of the rollers whereby a greater movement of the ring axially of the carrier is effected for a given angular movement when the ring is at the large end of the rollers than when the ring is at the small end of the rollers, and means operable from the exterior of the housing for moving said arm about the axis of said pivot.

2. The combination according to claim 1 in which the means operable from the exterior of the housing includes a gear segment mounted for movement with said arm about said pivot axis, and a gear meshing with said segment and rotatable from the exterior of the housing.

3. The combination with a variable speed transmission of the type having a rotary carrier, a plurality of inclined tapered planetary rollers rotatably mounted in said carrier for rotation with and with respect to the carrier, a pinion gear rotatable with each of the rollers, a ring gear meshing with said pinion gears and connected to an output shaft, and an axially movable control ring encircling said rollers, of means for regulating movement of the control ring, comprising, a pivot in said housing, an arm mounted on said pivot for rotational movement about the pivot axis, means connecting the arm to the ring so the ring is moved axially of the carrier as the arm is rotated, said pivot axis being parallel to and spaced from a plane containing the carrier axis and being substantially closer to the connecting means as measured axially of the carrier when the ring is at the large end of the rollers than when the ring is at the small end of the rollers so that the axial movement of the ring for equal increments of rotation of the arm increases substantially throughout the movement of the ring from the small end of the rollers to the large end of the rollers, and means operable from the exterior of the housing for rotating said arm.

References Cited in the file of this patent

UNITED STATES PATENTS

| 1,278,856 | Church | Sept. 17, 1918 |
| 1,887,505 | Gibson | Nov. 15, 1932 |
| 2,171,993 | Reichelt | Sept. 5, 1939 |
| 2,178,395 | Jepson | Oct. 31, 1939 |
| 2,178,399 | Madle | Oct. 31, 1939 |
| 2,263,936 | Taylor | Nov. 25, 1941 |
| 2,267,034 | Madle | Dec. 23, 1941 |
| 2,315,067 | Madle | Mar. 30, 1943 |
| 2,357,163 | Barrett | Aug. 29, 1944 |
| 2,535,409 | Graham | Dec. 26, 1950 |
| 2,602,522 | Roos | July 8, 1952 |